Oct. 9, 1923.

G. MODIGLIANI

MAGNETO ELECTRIC MACHINE

Filed June 11, 1919

Inventor:
Gino Modigliani
By
Attorney.

Oct. 9, 1923.

G. MODIGLIANI 1,470,092

MAGNETO ELECTRIC MACHINE

Filed June 11, 1919    3 Sheets-Sheet 2

Inventor:
Gino Modigliani
By [signature]
Attorney

Oct. 9, 1923.
G. MODIGLIANI
MAGNETO ELECTRIC MACHINE
Filed June 11, 1919     3 Sheets-Sheet 3
1,470,092
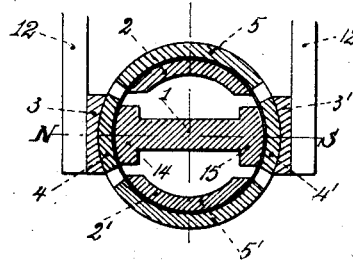
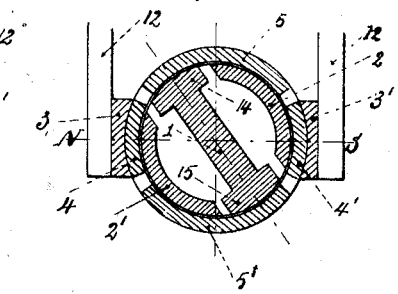
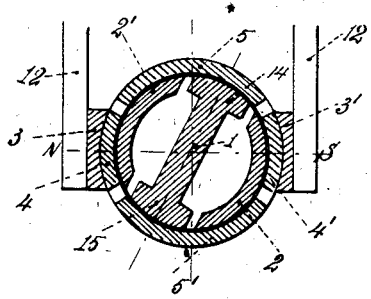
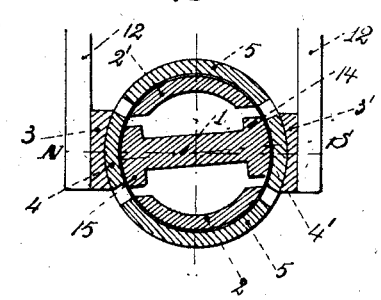
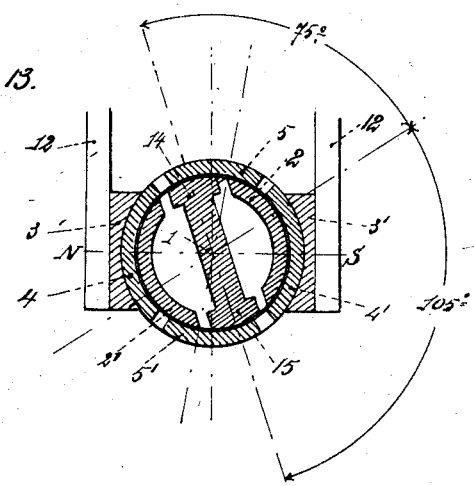
Inventor:
Gino Modigliani
By [signature]
Attorney.

Patented Oct. 9, 1923.

1,470,092

UNITED STATES PATENT OFFICE.

GINO MODIGLIANI, OF IVREA, ITALY, ASSIGNOR TO ING. CAMILLO OLIVETTI & C., OF IVREA, ITALY, A FIRM.

MAGNETO-ELECTRIC MACHINE.

Application filed June 11, 1919. Serial No. 303,414.

*To all whom it may concern:*

Be it known that I, GINO MODIGLIANI, subject of the King of Italy, residing at Ivrea, Kingdom of Italy, have invented certain new and useful Improvements in Magneto-Electric Machines, of which the following is a specification.

This invention relates to that type of magneto electric machine commonly called a magneto and serving to generate electric currents for various purposes but particularly for producing sparks in the sparking plugs of internal combustion engines.

The machine of this invention, according to the embodiment herein illustrated and described is of the type having fixed magnets and a movable armature, and owing to a special arrangement to be described later in each complete revolution of the armature there are six maxima of voltage, three being positive and three negative.

The six maxima of voltage may occur at angular distances of 60°, that is, at equal distances from each other, or at other predetermined angular distances, but at such distances the position of each maximum corresponds to another maximum at 180°. The sequence of events thus repeats itself at each half revolution.

One of the cases of the greatest practical importance, excepting that in which there are six maxima at 60° apart, is that of four maxima at 90° apart. In another case of six maxima, four occur at 90° apart, the other two maxima occurring respectively 30° from the first and fourth maxima of voltage. The six maxima at 60° or the four at 90° may be employed for high speed engines with several cylinders with the object of enabling the speed of the magneto to be one-third or even one-half that of an ordinary bi-polar magneto. The maxima at different angular distances may be employed in the special case of engines whose cylinders are arranged in the form of a V whatever be the angle between the axes of the cylinders.

In the accompanying drawings,—

Figs. 9, 10, 11 and 12 are diagrammatic sections of a magnetic electric machine having six maxima 60° apart and show the different positions of the rotating portion or armature for one complete revolution.

Fig. 13 is a diagram of a machine which can produce four maxima on two diameters 75° apart.

Figure 1:
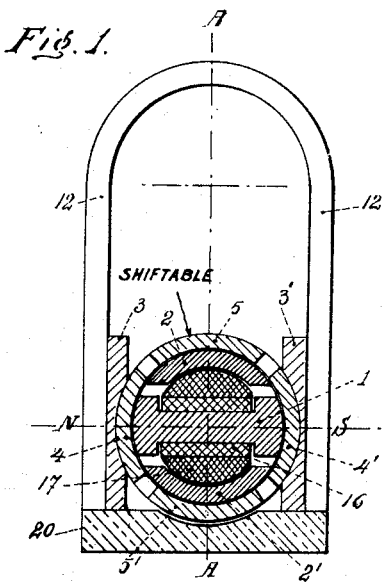
Figure 1 is a vertical section perpendicular to the axis of rotation of a magneto electric machine having six maxima of voltage, of which four are at distances of 90°.

Referring to Fig. 1, the rotor consists of a core 1 of I-shape of soft iron or other magnetic material. The core which carries the windings may also be formed of laminated, thin stampings of soft iron. Two circular crown segments 2 and 2' are also formed of soft iron or other magnetic material which may be isolated from part of the said rotor. Between the edges of the segments and those of the core is a space which may vary within certain limits. The several parts are secured together by means of end pieces 8 and 9 of non-magnetic material which carry the bearings 10 and 11 of the rotor.

The said bearings may be roller bearings and are held by supports 18 and 19 connected together by a base 20.

The stator consists of one or more magnets 12 and 13 having connected thereto two pole pieces 3 and 3'. Between the pole pieces 3 and 3' and the rotor are arranged four segments 4, 4', 5, 5', each of which occupies nearly one quarter of the circumference. These segments, each of which is firmly held by two annular plates 6 and 7 formed of non-magnetic material, can turn through a certain given angle around the axis of the machine.

Of the segments the two indicated by 4 and 4' rest upon the pole pieces of the magnet with which they remain always in contact. The other segments 5 and 5' magnetically insulated from 4 and 4' are maintained in an intermediate position and may be angularly displaced to approach one or the other of the two pole pieces 3 and 3'. This displacement may be such as always to leave at least a small space between the edge of the segment and the pole piece.

In order that the operation of the apparatus may be understood, reference should be had to the diagrams, Figs. 3, 4, 5 and 6.

Figure 3:
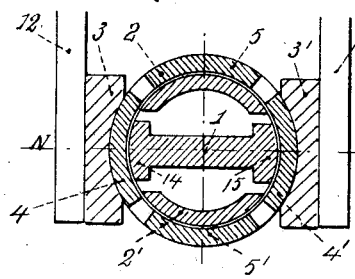
Figs. 3, 4, 5 and 6 are diagrammatic sections showing the different positions of the rotor or armature in the course of a complete revolution.

Supposing that the pole piece 3 is in contact with the north or positive pole of the magnet and that the pole piece 3' makes contact with the south or negative pole and that the flux from the magnet passes from the north pole to the south pole, in Fig. 3, the flux starting from the north pole piece 3 traverses the segment 4, passes into the core 1 through the end 14, passes out through 15 and traversing the segment 4' and the pole piece 3' will reach the south pole of the magnet.

It will be seen that a small part of the flux instead of traversing the core 1 passes by means of the segment 4 to the segments 2 and 2' and from these latter to the segments 4'. This may be avoided by lessening the angle subtended by the segments 4 and 4' but this is not very necessary as the passage of flux therethrough occurs at a moment when no variation of magnetic induction takes place in the core and consequently when no electro-motive force is produced. When said force is generated no shunting of the flux can take place.

Figure 4:
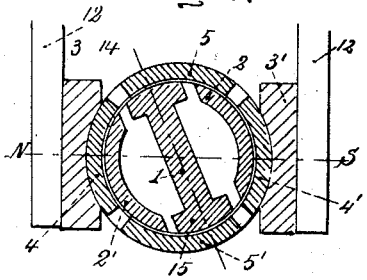

Suppose therefore that the rotor having turned through a certain angle comes into the position indicated in Fig. 4. In this case the flux passing out from the pole piece 3 will again traverse the segment 4 from which it passes to the movable segment 2' from which it reaches the segment 5' and from 5' it passes to the end 15 of the core 1 which in consequence is traversed by the flux in a direction opposite to that in the preceding position of the armature.

In the first case the flux passing from the north pole passes into the core through the end 14 while in Fig. 4 it enters at the opposite end 15; then passing from the end 14 of the core 1 it passes through the segment 5, from this segment it passes to the movable segment 2 and from 2 to the fixed segment 4', then into the south pole piece 3'.

Figure 5:
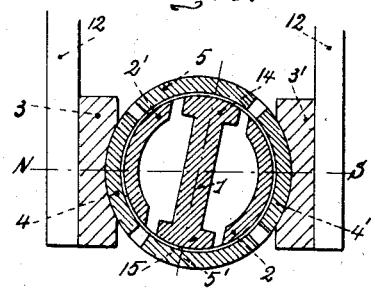

When the rotor has reached the position shown in Fig. 5 the flux in passing from 3 passes through the segment 4 to the movable segment 2', then to the fixed segment 5 and from this segment to the core 1. It enters through the end 14 and passes out through the end 15 to the segment 5' and passing by means of segments 2 and 4, it regains the pole piece 3'. The flux which traverses the core will therefore again have been reversed in direction.

Figure 6:
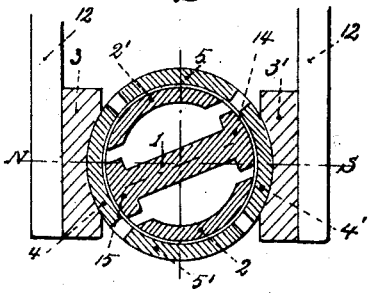

When the rotor has reached the position shown in Fig. 6, the flux passing out from 3 will traverse the segment 4 to the core 1 into which it passes directly to the end 15 through segment 4, to pass out through the end 14 and reaches the segment 4' from which it passes to the pole piece 3'. The flux in traversing the core has been again reversed in direction.

By means of another small displacement of the armature in the course of which no change takes place in the direction of the magnetic flux a position will be obtained symmetrical with that of starting (see Fig. 3). A half revolution will thus be completed during which the position of the magnetic flux in the core 1 has been reversed three times. In the seond half revolution the same phenomena take place identically and the diretion of the magnetic flux in the core will again be reversed three times. During the said six changes of direction of the flux in the core 1 as illustrated in Figs. 3, 4, 5 and 6, an insulated winding upon the core 1 (see 16, 17, Fig. 1) will be charged with electro-motive forces having three positive and three negative maxima of voltage for each complete revolution of the rotor.

On examining Figs. 3, 4, 5 and 6 it will be seen that the second change of direction of the flux (Fig. 5) and therefore the second maximum voltage takes place at about 30° from the first change (Fig. 4) and at 60° from the third (Fig. 6) as above described. The dotted lines indicated diagramatically in Figs 4, 5 and 6 show approximately the positions in which the maxima of electro-motive force are produced. It may be mentioned at this point that the magnetic circuit always remains closed.

Figs. 9, 10, 11 and 12 show a magneto capable of producing six changes of direction, and consequently six maxima, at equal angular distances apart, that is to say, at 60°. In the case above described the segments 4 and 4', and 5 and 5' of the field regulator subtend equal angles, but in this apparatus the segments 4 and 4' subtend about 50° while the segment 5 and 5' subtend about 110°. All the magnetic phenomena and the changes of direction take place identically as above described, the only difference being in the angle between the points at which the reversals take place, which angle is indicated by the dotted lines in Figs. 10, 11 and 13 and which moreover is always equal to 60°.

Fig. 13 shows a magneto which can produce four reversals of direction and consequently four maxima of voltage on two diameters (indicated by the dotted lines) at 75° apart and the other two maxima on an intermediate diameter. In order to obtain this angle, the angles subtended by the segments 4, 4', 5, 5', of the field regulator as well as those of the movable segments 2 and 2' and of the ends 14 and 15 of the core 1 have been modified.

In this case also the magnetic phenomena do not differ from those above mentioned but they take place at different angular distances. By means of suitable variations in the angles subtended by the segments 4, 4', 5, 5', as well as by the segments 2 and 2' and the ends 14 and 15 of the core 1 any desired angle between the different reversals of direction of the lines of magnetic induction can be obtained and consequently between the different maxima of electro-motive force in the winding 16, 17 upon the core 1.

In this magneto as in other high tension magnetos the spark is obtained by induction. The method of obtaining the spark will be described with the sole object of studying its application to the apparatus in question, and it should be understood that the said method forms no part of the present invention.

Figure 2:
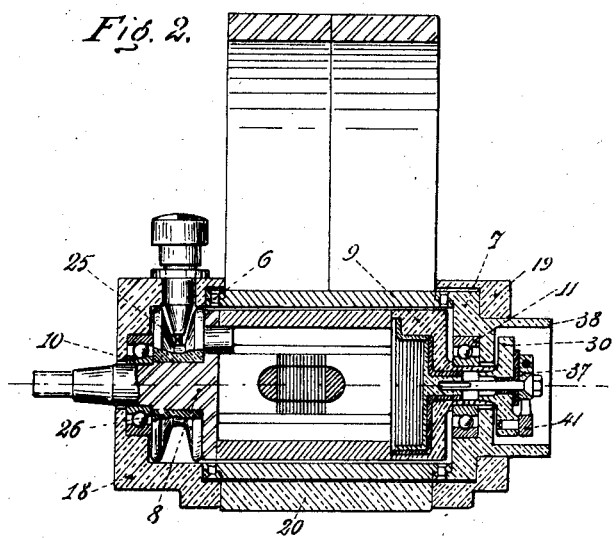
Fig. 2 is a section on the axial vertical plane.

Referring to Fig. 1, around the core 1 are wound two windings of which one 16 of thick wire consisting of a small number of turns is termed the low-tension winding and the other 17 arranged in series with the first and composed of a great number of turns of thin wire is termed the high tension winding. The low tension circuit is opened by a contact breaker indicated by 30, 37, 38 and 41, Fig. 2, which is opened at the proper moment by suitable means.

Figure 8:
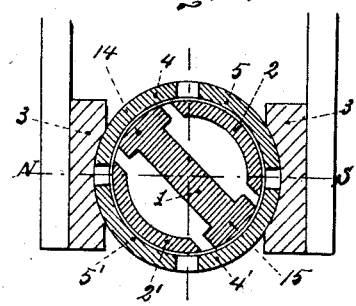
Fig. 8 is a section of a machine provided with said field regulator, showing the position it is made to occupy so that the armature will give at each complete revolution only two maxima of which one is positive and the other negative.

It may be desirable when the magneto is employed with internal combustion engines to regulate the firing in such a manner that this takes place at different positions of the piston according to the speed of the engine. This result may be obtained by moving the field regulating group. The positions of maximum electro-motive force will thus be moved and the contact breaker will operate at its most favorable position. It may further be remarked that if the field regulator be turned into the position indicated in Fig. 8, the magneto will be transformed into an ordinary magneto capable of giving two sparks only for each complete revolution. In effect the parts 4 and 5', as well as 4' and 5, become in this case a mere prolongation of the pole pieces 3, 3', and the segments 2 and 2' will have for their sole object that of maintaining the magnetic circuit closed.

Whatever be the position of the field regulator the magneto can always give maxima of electro-motive force; these maxima may vary from six to two per revolution according to the position of the regulator.

Figure 7:
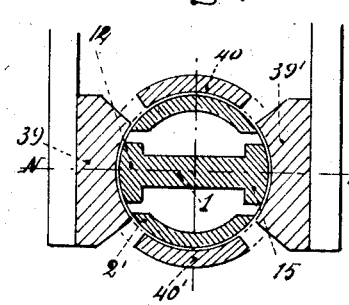
Fig. 7 is a diagram of a machine in which the assemblage of parts, hereinafter termed the field regulator, is omitted.

When it is not necessary to vary the positions of maxima of electro-motive force and therefore the positions in which the spark should be discharged the field regulator may be omitted. The magneto will then be constructed as shown in Fig. 7 in which 39 and 39' are the north and south pole of the magnets and 40 and 40' pole pieces are two segments of magnetic material or of stampings of soft iron fixed in the position indicated and magnetically insulated from the pole pieces of the magnets. When the magneto is employed in four or six cylinder internal combustion engines the distributor (see Fig. 1) turns at the same speed as the magneto and may consequently be mounted upon the magneto shaft without the use of gearing for reducing speed as is necessary with bi-polar magnetos.

I claim as my invention:—

1. A bi-polar magneto having a stator constituted by permanent magnetic means having two poles; a rotor having a core with two poles and a coil carried by the core; an element carried by the stator and having a plurality of pole pieces isolated magnetically from each other, one of said pole pieces being in magnetic contact with one pole of the stator and another being in magnetic contact with the other pole of the stator, the other pole pieces being located between the pole pieces aforesaid and being in structure isolated magnetically from said pole pieces; and means carried by the rotor for alternately connecting magnetically said isolated pole pieces to said pole pieces.

2. In a bi-polar magneto, in combination with magnet poles; an armature and winding carried thereby; and means for extending the magnetic influence of the magnet poles alternately in opposite directions to cause more than two maxima of voltage to be produced for each revolution of the armature, said means comprising flux shifting means carried by the armature.

3. In a bi-polar magneto, in combination with magnet poles; an armature; and means for extending the magnetic influence of the magnet poles alternately in opposite directions to produce more than two maxima of voltage for each revolution of the armature, said means comprising elements of magnetic material carried by the armature, and pole pieces disposed between the magnet poles and adapted to be brought temporarily into magnetic contact with the magnet poles by said means on the armature.

4. In a bi-polar magneto, in combination with the magnet poles; an armature having a two poled core and winding thereon, said core providing direct passage for the magnetic flux from the magnet poles in certain positions of the armature; and means whereby the magnetic flux passes through said core when the pole pieces thereof are located out of direct range of the magnet poles.

5. In a bi-polar magneto, in combination with the magnet poles; an armature having a two poled core and winding thereon, said core providing direct passage for the magnetic flux from the magnet poles in certain positions of the armature; and means whereby the magnetic flux also passes through said core when the poles thereof are located out of direct range of the magnet poles, said means comprising temporary stator pole pieces, and means for magnetically connecting the temporary stator pole pieces alternately to opposite magnet poles.

6. In a bi-polar magneto, in combination with the magnet poles; an armature having a two poled core and winding thereon, said core providing direct passage for the magnetic flux from the magnet poles in certain positions of the armature; and means whereby the magnetic flux also passes through said core when the poles thereof are located out of direct range of the magnet poles, said means comprising auxiliary stator pole pieces, and bridge members carried by said armature and adapted to conduct the flux from the magnet poles to the auxiliary stator pole pieces.

7. In a bi-polar magneto, in combination with the stator magnet poles; an armature; and a plurality of sets of pole pieces mounted on the stator for rotation, the pole pieces being magnetically isolated from each other and being adapted to be magnetically isolated from the magnet poles, said plurality of sets of pole pieces being rotatable to bring one set of pole pieces into magnetic contact with the magnet poles and to be further rotated to bring two sets of pole pieces into magnetic contact with the magnet pole pieces.

8. A magneto electric machine having stator magnets, an armature comprising a core, windings carried by the core, the stator magnets having four soft iron field pieces isolated magnetically from each other, two of said field pieces magnetically contacting with the magnet poles, the rotor having two segments isolated from each other and from the stator.

9. A magneto electric machine having stator magnets and four soft iron pole pieces magnetically isolated from each other, two of said pole pieces magnetically contacting with the magnet poles, and an armature comprising a core having two poles, windings carried by the core, and two segments of soft iron located between the poles, said segments and pole pieces being so arranged that in the course of the rotation of the armature the direction of the flux passing through the core is reversed six times for each complete revolution of the armature, producing in consequence six maxima of voltage in the windings.

10. A magneto electric machine having stator magnets and four soft iron pole pieces magnetically isolated from each other, two of said pole pieces magnetically contacting with the magnet poles, and an armature comprising a core having two poles, windings carried by the core, and two segments of soft iron located between the poles, said segments and pole pieces being so arranged that in the course of the rotation of the armature the direction of the flux passing through the core is reversed six times for each complete revolution of the armature, producing in consequence six maxima of voltage in the windings, said pole pieces being adjustable whereby the positions of three maxima may be varied, each of the other three being always at 180° from the position of the corresponding maxima of the first three.

11. A magneto electric machine having stator magnets and four soft iron pole pieces magnetically isolated from each other, two of said pole pieces magnetically contacting with the magnet poles, and an armature comprising a core having two poles, windings carried by the core, and two segments of soft iron located between the poles, said segments and pole pieces being so arranged that in the course of the rotation of the armature the direction of the flux passing through the core is reversed six times for each complete revolution of the armature, producing in consequence six maxima of voltage in the windings, said pole pieces being adjustable whereby only two maxima of voltage are attained for each revolution of the armature.

12. In a magneto electric machine, a stator having two pole pieces; a rotor comprising an armature; an auxiliary stator element having four pole pieces magnetically insulated from each other and placed between poles of the stator; and two segments carried by the armature whereby the direction of the lines of induction through the armature is reversed more than twice as the armature makes one complete revolution.

In testimony whereof I affix my signature.

GINO MODIGLIANI.